United States Patent
O'Sullivan et al.

(10) Patent No.: US 10,129,703 B2
(45) Date of Patent: *Nov. 13, 2018

(54) USER PATH DETERMINING SYSTEM AND METHOD THEREFOR

(71) Applicant: SITA INFORMATION NETWORKING COMPUTING USA, INC., Atlanta, GA (US)

(72) Inventors: Kevin O'Sullivan, Hove (GB); Stephane Cheikh, Crozet (FR)

(73) Assignee: SITA INFORMATION NETWORKING COMPUTING USA, INC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/267,986

(22) Filed: Sep. 16, 2016

(65) Prior Publication Data
US 2017/0006432 A1    Jan. 5, 2017

Related U.S. Application Data

(63) Continuation of application No. 13/763,217, filed on Feb. 8, 2013, now Pat. No. 9,491,574.

(Continued)

(30) Foreign Application Priority Data

Nov. 21, 2012    (GB) .................................... 1220976.3

(51) Int. Cl.
*H04W 4/02*    (2018.01)
*G01S 1/68*    (2006.01)
(Continued)

(52) U.S. Cl.
CPC ............. *H04W 4/028* (2013.01); *G01S 1/685* (2013.01); *G01S 5/0294* (2013.01); *H04W 4/02* (2013.01);
(Continued)

(58) Field of Classification Search
CPC ...... H04W 40/20; H04W 4/027; H04W 64/00
(Continued)

(56) References Cited

U.S. PATENT DOCUMENTS 4,821,118 A    4/1989    Lafreniere
5,270,921 A    12/1993    Hornick
(Continued)

FOREIGN PATENT DOCUMENTS

AU    2002317935 A1    1/2003
CN    101436185 A    5/2009
(Continued)

OTHER PUBLICATIONS

AIRCOM Server Administrator Guide, SITA Airline Telecommunications and Information Services, Feb. 19, 2013, pp. 1-280.
(Continued)

*Primary Examiner* — Jaime Holliday
(74) *Attorney, Agent, or Firm* — Morris, Manning & Martin, LLP; Daniel E. Sineway, Esq.; R. Lee Strasburger, Jr., Esq.

(57) ABSTRACT

A system for determining a user's path is described. The system comprises a location server arranged to receive location data of a communication device associated with the user, the location data defining the detected position of the communication device at a number of different points in time, the location server further arranged to receive sequence data associated with the location data indicative of the order in which the location data was determined; path determining means for determining the user's path passing through points defined by the received location data and the associated sequence data; and a comparator for comparing the determined path of the user with one or more predetermined user paths; wherein the location server processes the received location data depending upon the result of the (Continued)

comparison and corrects the determined user path with the processed location data.

16 Claims, 6 Drawing Sheets

Related U.S. Application Data

(60) Provisional application No. 61/596,980, filed on Feb. 9, 2012.

(51) Int. Cl.
  *G01S 5/02* (2010.01)
  *H04W 4/029* (2018.01)
  *H04W 40/20* (2009.01)
  *H04W 64/00* (2009.01)

(52) U.S. Cl.
  CPC ......... *H04W 4/029* (2018.02); *H04W 64/006* (2013.01); *H04W 4/027* (2013.01); *H04W 40/20* (2013.01); *H04W 64/00* (2013.01)

(58) Field of Classification Search
  USPC .................. 455/404.2, 414.1, 456.1–457
  See application file for complete search history.

(56) References Cited

U.S. PATENT DOCUMENTS

| | | |
|---|---|---|
| 5,748,850 A | 5/1998 | Sakurai |
| 5,793,639 A | 8/1998 | Yamazaki |
| 5,897,620 A | 4/1999 | Walker |
| 5,918,209 A | 6/1999 | Campbell et al. |
| 6,044,353 A | 3/2000 | Pugliese, III |
| 6,108,636 A | 8/2000 | Yap et al. |
| 6,112,185 A | 8/2000 | Walker et al. |
| 6,158,658 A | 12/2000 | Barclay |
| 6,192,416 B1 | 2/2001 | Baxter |
| 6,259,405 B1 | 7/2001 | Stewart |
| 6,367,016 B1 | 4/2002 | Lambert et al. |
| 6,414,635 B1 | 7/2002 | Stewart |
| 6,473,704 B1 | 10/2002 | Ito et al. |
| 6,553,336 B1 | 4/2003 | Johnson |
| 6,661,340 B1 | 12/2003 | Saylor et al. |
| 6,695,203 B2 | 2/2004 | Iki et al. |
| 6,735,630 B1 | 5/2004 | Gelvin |
| 6,736,322 B2 | 5/2004 | Gobburu |
| 6,757,712 B1 | 6/2004 | Bastian et al. |
| 6,758,394 B2 | 7/2004 | Maskatiya |
| 6,760,778 B1 | 7/2004 | Nelson et al. |
| 6,869,023 B2 | 3/2005 | Hawes et al. |
| 6,972,682 B2 | 12/2005 | Lareau |
| 7,027,808 B2 | 4/2006 | Wesby |
| 7,035,828 B2 | 4/2006 | Ketonen et al. |
| 7,212,978 B2 | 5/2007 | Kowal et al. |
| 7,258,276 B2 | 8/2007 | Linton et al. |
| 7,275,689 B2 | 10/2007 | Mak |
| 7,327,262 B2 | 2/2008 | Motteram et al. |
| 7,421,319 B2 | 9/2008 | Stefani |
| 7,440,967 B2 | 10/2008 | Chidlovskii |
| 7,454,203 B2 | 11/2008 | Levitan |
| 7,483,696 B1 | 1/2009 | Mitchell |
| 7,486,171 B2 | 2/2009 | Kim |
| 7,486,960 B2 | 2/2009 | Brady, Jr. et al. |
| 7,539,985 B2 | 5/2009 | Marvin |
| 7,571,206 B2 | 8/2009 | Koning et al. |
| 7,599,847 B2 | 10/2009 | Block |
| 7,607,080 B2 | 10/2009 | Heuer et al. |
| 7,664,672 B1 | 2/2010 | Walker et al. |
| 7,668,873 B2 | 2/2010 | Davis et al. |
| 7,685,009 B2 | 3/2010 | Halavais et al. |
| 7,702,328 B2 | 4/2010 | Lemond et al. |
| 7,720,724 B2 | 5/2010 | Kurashige |
| 7,739,292 B2 | 6/2010 | Falk et al. |
| 7,786,899 B2 | 8/2010 | Baker et al. |
| 7,805,523 B2 | 9/2010 | Mitchell et al. |
| 7,870,101 B2 | 1/2011 | Hubbard et al. |
| 7,882,137 B2 | 2/2011 | Lepman |
| 7,907,067 B2 | 3/2011 | Baker et al. |
| 7,907,545 B2 | 3/2011 | Ric |
| 7,949,335 B2 | 5/2011 | Stefani et al. |
| 7,954,712 B2 | 6/2011 | Babcock et al. |
| 8,001,519 B2 | 8/2011 | Conallen et al. |
| 8,058,972 B2 | 11/2011 | Mohanty |
| 8,087,583 B2 | 1/2012 | Hawes |
| 8,090,603 B2 | 1/2012 | Payne et al. |
| 8,117,051 B2 | 2/2012 | Sauvage et al. |
| 8,160,759 B2 | 4/2012 | Baker et al. |
| 8,165,809 B1 | 4/2012 | Baker et al. |
| 8,170,535 B1 | 5/2012 | Lopes et al. |
| 8,195,151 B2 | 6/2012 | Cerra, II et al. |
| 8,214,144 B2 | 7/2012 | Baker et al. |
| 8,229,458 B2 | 7/2012 | Busch |
| 8,296,281 B2 | 10/2012 | Baker et al. |
| 8,332,136 B2 | 12/2012 | Baker et al. |
| 8,467,726 B2 | 6/2013 | Shirakata |
| 8,509,441 B2 | 8/2013 | Yoon |
| 8,521,681 B2 | 8/2013 | Ouchi |
| 8,606,508 B2 | 12/2013 | Baker et al. |
| 8,631,358 B2 | 1/2014 | Louch |
| 8,665,238 B1 | 3/2014 | Gossweiler, III |
| 8,671,009 B1 | 3/2014 | Coley et al. |
| 8,700,236 B1 | 4/2014 | Berman |
| 8,713,661 B2 | 4/2014 | Vysogorets et al. |
| 8,949,142 B1 | 2/2015 | Angrish |
| 8,977,568 B1 | 3/2015 | Schattauer |
| 9,024,752 B2 | 5/2015 | Tumayan |
| 9,026,461 B2 | 5/2015 | Calman |
| 9,047,512 B2 | 6/2015 | Otis |
| 9,134,955 B2 | 9/2015 | Healey |
| 9,141,325 B2 | 9/2015 | Dersy |
| 9,239,246 B2 | 1/2016 | Jones |
| 9,275,550 B1 | 3/2016 | Stefani |
| 9,541,632 B2 | 1/2017 | Frank |
| 9,552,564 B1 | 1/2017 | Martenis |
| 9,589,262 B2 | 3/2017 | Graylin |
| 9,589,405 B2 | 3/2017 | Cabouli |
| 9,599,989 B1 | 3/2017 | Brown |
| 9,710,920 B2 | 7/2017 | Utsunomiya |
| 9,749,831 B2 | 8/2017 | Lee |
| 2002/0138184 A1 | 9/2002 | Kipersztok et al. |
| 2002/0138625 A1 | 9/2002 | Bruner et al. |
| 2002/0160773 A1 | 10/2002 | Gresham et al. |
| 2003/0034390 A1 | 2/2003 | Linton et al. |
| 2003/0048471 A1 | 3/2003 | Lundgren |
| 2003/0093187 A1 | 5/2003 | Walker |
| 2003/0111530 A1 | 6/2003 | Iki et al. |
| 2003/0130769 A1 | 7/2003 | Farley et al. |
| 2003/0146871 A1 | 8/2003 | Karr et al. |
| 2003/0150922 A1 | 8/2003 | Hawes |
| 2003/0220116 A1 | 11/2003 | Sagefalk et al. |
| 2004/0030855 A1 | 2/2004 | Takeuchi et al. |
| 2004/0039617 A1 | 2/2004 | Maycotte et al. |
| 2004/0128193 A1 | 7/2004 | Brice et al. |
| 2004/0249836 A1 | 12/2004 | Reynders et al. |
| 2005/0004919 A1 | 1/2005 | Green et al. |
| 2005/0033666 A1 | 2/2005 | Kurashige |
| 2005/0071206 A1 | 3/2005 | Berge |
| 2005/0212701 A1* | 9/2005 | Nimmo ............ A63B 24/0021 342/357.57 |
| 2005/0228702 A1 | 10/2005 | Fairbanks et al. |
| 2005/0258230 A1 | 11/2005 | Wiater |
| 2005/0258247 A1 | 11/2005 | Hawes |
| 2006/0004590 A1 | 1/2006 | Khoo |
| 2006/0004781 A1 | 1/2006 | Burgel et al. |
| 2006/0053056 A1 | 3/2006 | Alspach-Goss et al. |
| 2006/0075934 A1 | 4/2006 | Ram |
| 2006/0085451 A1 | 4/2006 | Pal et al. |
| 2006/0095434 A1 | 5/2006 | McCullough et al. |
| 2006/0097046 A1 | 5/2006 | Baru Fassio et al. |
| 2006/0173680 A1 | 8/2006 | Verhasselt et al. |
| 2006/0206246 A1 | 9/2006 | Walker |
| 2006/0234700 A1 | 10/2006 | Funderburk et al. |

(56) References Cited

U.S. PATENT DOCUMENTS

| | | |
|---|---|---|
| 2006/0238384 A1 | 10/2006 | Hess et al. |
| 2006/0259456 A1 | 11/2006 | Falk et al. |
| 2006/0277231 A1 | 12/2006 | Kral et al. |
| 2006/0288021 A1 | 12/2006 | Kojima |
| 2007/0055416 A1 | 3/2007 | Allen |
| 2007/0072590 A1 | 3/2007 | Levitan |
| 2007/0111725 A1 | 5/2007 | Kauffman et al. |
| 2007/0127460 A1 | 6/2007 | Wilber et al. |
| 2007/0133487 A1 | 6/2007 | Wang et al. |
| 2007/0149216 A1 | 6/2007 | Misikangas |
| 2007/0157078 A1 | 7/2007 | Anderson |
| 2007/0198314 A1 | 8/2007 | Andrew et al. |
| 2007/0203796 A1 | 8/2007 | Riggs |
| 2007/0222595 A1 | 9/2007 | Motteram et al. |
| 2007/0233617 A1 | 10/2007 | Gillespie |
| 2007/0244766 A1 | 10/2007 | Goel |
| 2007/0250356 A1 | 10/2007 | Douglas |
| 2007/0265881 A1 | 11/2007 | El Eman et al. |
| 2007/0273514 A1 | 11/2007 | Winand et al. |
| 2008/0010005 A1 | 1/2008 | Small et al. |
| 2008/0015926 A1 | 1/2008 | Marcken |
| 2008/0027765 A1 | 1/2008 | Gunn et al. |
| 2008/0027955 A1 | 1/2008 | May et al. |
| 2008/0046298 A1 | 2/2008 | Ben-Yehuda et al. |
| 2008/0065480 A1 | 3/2008 | Baker et al. |
| 2008/0070517 A1 | 3/2008 | Brady et al. |
| 2008/0091445 A1 | 4/2008 | Mihic |
| 2008/0099552 A1 | 5/2008 | Grillion |
| 2008/0140226 A1 | 6/2008 | Ganev |
| 2008/0140434 A1 | 6/2008 | O'Brien |
| 2008/0224823 A1 | 9/2008 | Lawson et al. |
| 2008/0229228 A1 | 9/2008 | Cohen |
| 2009/0010200 A1 | 1/2009 | Lauer et al. |
| 2009/0015398 A1 | 1/2009 | Bhogal et al. |
| 2009/0030781 A1 | 1/2009 | Mehta et al. |
| 2009/0033491 A1 | 2/2009 | Saunders |
| 2009/0063219 A1 | 3/2009 | Raufaste et al. |
| 2009/0070841 A1 | 3/2009 | Buga et al. |
| 2009/0081947 A1 | 3/2009 | Margis |
| 2009/0112473 A1 | 4/2009 | Lu et al. |
| 2009/0164500 A1 | 6/2009 | Mathur et al. |
| 2009/0182590 A1 | 7/2009 | Ashby et al. |
| 2009/0187494 A1 | 7/2009 | Heath |
| 2009/0196201 A1 | 8/2009 | Ric |
| 2009/0248457 A1 | 10/2009 | Munter et al. |
| 2009/0256675 A1 | 10/2009 | Kerr |
| 2009/0259549 A1 | 10/2009 | Winand et al. |
| 2009/0266882 A1 | 10/2009 | Sajkowsky |
| 2009/0287513 A1 | 11/2009 | Anderson et al. |
| 2009/0288123 A1 | 11/2009 | Havlovick et al. |
| 2009/0307020 A1 | 12/2009 | Viale et al. |
| 2009/0310530 A1 | 12/2009 | Cerra, II et al. |
| 2009/0313601 A1 | 12/2009 | Baird et al. |
| 2010/0027461 A1 | 2/2010 | Bothorel |
| 2010/0030591 A1 | 2/2010 | Viard et al. |
| 2010/0065632 A1 | 3/2010 | Babcock et al. |
| 2010/0076795 A1 | 3/2010 | Steir et al. |
| 2010/0076826 A1 | 3/2010 | Bayne |
| 2010/0078475 A1 | 4/2010 | Lin et al. |
| 2010/0102934 A1 | 4/2010 | Guichard |
| 2010/0159871 A1 | 6/2010 | Tester |
| 2010/0190510 A1 | 7/2010 | Maranhas et al. |
| 2010/0191782 A1 | 7/2010 | Brzozowski |
| 2010/0197318 A1 | 8/2010 | Peterson et al. |
| 2010/0198628 A1 | 8/2010 | Rayner |
| 2010/0205448 A1 | 8/2010 | Tarhan et al. |
| 2010/0245034 A1 | 9/2010 | D'Oliveiro et al. |
| 2010/0268656 A1 | 10/2010 | Teicher |
| 2010/0332358 A1 | 12/2010 | Owens |
| 2011/0004832 A1 | 1/2011 | Canal et al. |
| 2011/0018769 A1 | 1/2011 | Misikangas et al. |
| 2011/0028160 A1 | 2/2011 | Roeding et al. |
| 2011/0119183 A1 | 5/2011 | Berman |
| 2011/0227737 A1 | 9/2011 | Kamins |
| 2012/0035965 A1 | 2/2012 | Maguire et al. |
| 2012/0041313 A1 | 2/2012 | Tanaka |
| 2012/0042263 A1 | 2/2012 | Rapaport et al. |
| 2012/0042371 A1 | 2/2012 | Gur et al. |
| 2012/0075168 A1 | 3/2012 | Osterhout et al. |
| 2012/0101885 A1 | 4/2012 | Lee et al. |
| 2012/0123844 A1 | 5/2012 | Fano et al. |
| 2012/0129546 A1 | 5/2012 | Yang et al. |
| 2012/0200390 A1 | 8/2012 | Saravanan |
| 2012/0203578 A1 | 8/2012 | Baggett et al. |
| 2012/0284108 A1 | 11/2012 | Fontana et al. |
| 2013/0069985 A1 | 3/2013 | Wong et al. |
| 2013/0085861 A1* | 4/2013 | Dunlap .............. G01S 19/34 705/14.58 |
| 2013/0141313 A1 | 6/2013 | Zhou et al. |
| 2013/0211864 A1 | 8/2013 | Sanderson et al. |
| 2013/0234849 A1 | 9/2013 | Gupta et al. |
| 2013/0267255 A1 | 10/2013 | Liu et al. |
| 2013/0295966 A1 | 11/2013 | Dingler et al. |
| 2013/0297103 A1 | 11/2013 | Baker et al. |
| 2013/0314257 A1 | 11/2013 | MacRae et al. |
| 2013/0325526 A1 | 12/2013 | Tyler |
| 2014/0006070 A1 | 1/2014 | Stamler |
| 2014/0012640 A1 | 1/2014 | Roberts et al. |
| 2014/0039717 A1 | 2/2014 | Henkel |
| 2014/0052482 A1 | 2/2014 | Le Marier et al. |
| 2014/0067244 A1 | 3/2014 | Baker et al. |
| 2014/0075506 A1 | 3/2014 | Davis et al. |
| 2014/0123315 A1 | 5/2014 | Baker et al. |
| 2014/0188311 A1 | 7/2014 | Masson |
| 2014/0223043 A1 | 8/2014 | Dersy |
| 2016/0152350 A1 | 6/2016 | Puentes |
| 2016/0180255 A1 | 6/2016 | Goedemondt |
| 2017/0004444 A1 | 1/2017 | Krasko |
| 2017/0032263 A1 | 2/2017 | Yuan |

FOREIGN PATENT DOCUMENTS

| | | |
|---|---|---|
| CN | 101911668 A | 12/2010 |
| DE | 10357831 A1 | 7/2005 |
| DE | 102009020228 A1 | 11/2010 |
| EP | 1308864 A1 | 5/2003 |
| EP | 1318463 A1 | 6/2003 |
| EP | 0770546 B1 | 12/2003 |
| EP | 1454306 A2 | 9/2004 |
| EP | 1 610 094 A1 | 12/2005 |
| EP | 1679624 A2 | 7/2006 |
| EP | 1874001 B1 | 1/2008 |
| EP | 2088543 A1 | 8/2009 |
| EP | 2088569 A1 | 8/2009 |
| EP | 2222053 A1 | 8/2010 |
| EP | 2290600 A2 | 3/2011 |
| EP | 2362354 A2 | 8/2011 |
| EP | 2390845 A1 | 11/2011 |
| EP | 2474931 A1 | 7/2012 |
| EP | 2932902 B1 | 12/2016 |
| EP | 1872294 B1 | 11/2017 |
| GB | 2366945 A | 3/2002 |
| GB | 2408131 B | 3/2006 |
| GB | 2418511 A | 3/2006 |
| GB | 2469026 A | 10/2010 |
| GB | 2470897 A | 12/2010 |
| JP | 2003157984 A | 5/2003 |
| JP | 2005135199 A | 5/2005 |
| JP | 2006053724 A | 2/2006 |
| JP | 2008117340 A | 5/2008 |
| JP | 2008171181 A | 7/2008 |
| JP | 2009093603 A | 4/2009 |
| JP | 2017129981 A | 7/2017 |
| WO | 0073954 A2 | 12/2000 |
| WO | 200135269 A2 | 5/2001 |
| WO | 200135289 A1 | 5/2001 |
| WO | 2001057323 A1 | 8/2001 |
| WO | 0215582 A1 | 2/2002 |
| WO | 03005237 A1 | 1/2003 |
| WO | 2004045106 A1 | 5/2004 |
| WO | 2006010774 A1 | 2/2006 |
| WO | 2007113844 A1 | 10/2007 |
| WO | 2008055181 A2 | 5/2008 |
| WO | 2009002139 A1 | 12/2008 |

(56) References Cited

FOREIGN PATENT DOCUMENTS

| | | |
|---|---|---|
| WO | 2009021068 A1 | 2/2009 |
| WO | 2009058505 A1 | 5/2009 |
| WO | 2009091553 A1 | 7/2009 |
| WO | 2009/151925 A2 | 12/2009 |
| WO | 2011057323 A1 | 5/2011 |
| WO | 2011088233 A1 | 7/2011 |
| WO | 2012105829 A2 | 8/2012 |
| WO | 2012106075 A1 | 8/2012 |
| WO | 2013079512 A1 | 6/2013 |

OTHER PUBLICATIONS

AIRCOM Server User Guide, SITA Airline Telecommunications and Information Services, Jan. 24, 2013, pp. 1-153.
Belobaba, Fundamentals of Pricing and Revenue Management, The Global Airline Industry, 2009.
Caliendo, et al., Social Networks, Job Search Methods and Reservation Wages: Evidence for Germany, IZA, Sep. 2010, Germany.
Chen, et al., "A Survey of Context-Aware Mobile Computing Research", Department of Computer Science, Dartmouth College, 2000, pp. 1-16, Hanover, New Hampshire.
Examination Report dated Apr. 28, 2014 in Malaysian Application No. PI 2013000936.
Examination Report of Malaysian Application No. 2013001405, received from the Intellectual Property Corporation of Malaysia dated Oct. 28, 2014.
Glaser-Opitz, et al., Evaluation of CPDLC and Voice Communication During Approach Phase, Digital Avionics Conference, Sep. 13-17, 2015.
Glushko, et al., Bridging the "Front Stage" and "Back Stage" in Service System Design, Proceedings of the 41st Hawaii International Conference on System Sciences, 2008, pp. 1-10, California.
Hull, et al., Technology-Enabled Airborne Spacing and Merging, Digital Avionics Systems Conference, 2004.
International Examination Report mailed in Australian Application No. 2011347893 dated Sep. 11, 2015.
International Search Report and the Written Opinion mailed in International Application No. PCT/EP2013/052590 dated Aug. 2, 2013.
International Search Report and the Written Opinion mailed in International Application No. PCT/EP2013/057497 dated Oct. 4, 2013.
International Search Report and Written Opinion mailed in International Application No. PCT/EP2011/070551 dated Nov. 21, 2011.
International Search Report and Written Opinion mailed in International Application No. PCT/EP2014/055037 dated Mar. 13, 2014.
International Search Report and Written Opinion mailed in International Application No. PCT/EP2014/062464 dated Jun. 13, 2014.
International Search Report and Written Opinion mailed in International Application No. PCT/EP2015/053319 dated Feb. 17, 2015.
International Search Report and Written Opinion mailed in International Application PCT/EP2015/068682 dated Oct. 29, 2015.
International Search Report and Written Opinion mailed in Singapore Application No. 11201404575U dated Jun. 16, 2015.
International Search Report mailed in International Application No. PCT/EP2011/072286 dated Sep. 12, 2011.
Kenney, et al., Secure ATC Surveillance for Military Applications, Military Communications Conference, 2008.
Kindervater, Revenue Management in the Airline Passenger Industry, 2007, pp. 1-24, Lunteren.
Kinneging, Machine Readable Travel Documents-Technical Report, PKI for Machine Readable Travel Documents Offering ICC Read-Only Access, PKI Task Force, International Civil Aviation Organization, Version 1.1, Oct. 1, 2004, pp. 1-58.
Kirby, Personal Services—In-flight connectivity poised to change the passenger experience for ever, http://www.flightglobal.com/news/articles/personal-services-in-flight-connectivity-poised-to-change-the-passenger-experience-for-332765/, Article dated Se.
Kitson, The Future of In-flight: Part Two—The Concierge Concept, http://ustwo.com/blog/the-future-of-in-flight-part-two-the-concierge-concept/, Article dated Apr. 2012.
Lee, et al., Effectiveness of the Ground-Based Transceiver (GBT) Parrot System for Monitoring GPS Integrity for Alaska ATC "Radar-Like Services" Using ADS-B, Digital Avionics Systems Conference, 2004.
Li, et al., XVM: A Bridge Between XML Data and Its Behavior, May 17-22, 2004, pp. 1-9, New York.
Machine Readable Travel Documents, Part 1, Machine Readable Passports—vol. 1, Passports with Machine Readable Data Stored in Optical Character Recognition Format, International Civil Aviation Organization, Sixth Edition, 2006, pp. 1-99.
Machine Readable Travel Documents, Part 1, Machine Readable Passports—vol. 2, Specifications for Electronically Enabled Passports with Biometric Identification Capability, International Civil Aviation Organization, Sixth Edition, 2006, pp. 1-131.
Machine Readable Travel Documents, Part 3, Machine Readable Official Travel Documents—vol. 1, MRtds with Machine Readable Data Stored in Optical Character Recognition Text, International Civil Aviation Organization, Third Edition, 2008, pp. 1-122.
Machine Readable Travel Documents, Part 3, Machine Readable Official Travel Documents—vol. 2, Specifications or Electronically Enabled MRtds with Biometric Identification Capability, International Civil Aviation Organization, Third Edition, 2008, page.
Madria, et al., An XML Schema Integration and Query Mechanism System, Science Direct, Data and Knowledge Engineering 65, 2008, pp. 266-303.
Marmasse, et al., Location-aware information delivery with comMotion, MIT Media Laboratory, HUC 2000 Proceedings, 2000, pp. 157-171.
McGuire, et al., The Future of Revenue Management, SAS Global Forum, 2009, pp. 1-5.
Robert Longley, "TSA's New ID, Boarding Pass Scanning System Draws Criticism", US Government, About.com, Aug. 2, 2012, 2 pages, retrieved online on Jul. 30, 2014, http://usgovinfo.about.com/od/defenseandsecurity/a/Tsa-Boarding-Pass-Scanning-System-Draws-.
Russian Search Report for 2013133853/08(050668) dated Feb. 20, 2015.
Schechner, Airlines Entertain Tablet Ideas—Rather Than Wiring Planes for In-Flight Movies, Some Hand Out iPads, http://online.wsj.com/articles/SB10000872396390443916104578020601759253578, Article dated Sep. 2012.
Schwinger, et al., Context-Awareness in Mobile Tourism Guides—A Comprehensive Survey, 2002, pp. 1-20.
Search Report and Examination Opinion dated May 19, 2015 in International Application No. GB1421313.6.
Search Report and Written Opinion dated Apr. 2, 2014 in GB Application No. 1317659.9.
Search Report and Written Opinion mailed in International Singapore Application No. 201306353-2, dated Apr. 11, 2014, by the Danish Patent and Trademark Office.
Search Report and Written Opinion of Singapore Application No. 201301980-7, dated Sep. 3, 2013.
Search Report dated Aug. 6, 2015 in European patent application No. 15176140.0.
Smith, et al., Yield Management at American Airlines, American Airline Decision Technologies, 1992, pp. 8-31.
Stellin, "Automation Is Considered for Checking IDs in Airports", Business Day, The New York Times, Mar. 19, 2012, 3 pages, retrieved Sep. 4, 2014, http://www.nytimes.com/2012/03/20/business/tsa-is-considering-automating-id-checks.html.
Written Opinion mailed in Singapore Application No. 201301978-1, dated Oct. 15, 2013.
Xu, et al., A Model of Capacity Control with Overbooking for a Two-leg Airlines Network, IEEE 2008, pp. 1-5.
Dunkel, et al., Model-Driven Architecture for Mobile Applications, 2007, pp. 464-477, Hanover, Germany.

(56) References Cited

OTHER PUBLICATIONS

Johnston, et al., Multimodal Applications from Mobile to Kiosk, 2004, pp. 1-4.

Munoz, et al., Context-Aware Mobile Communication in Hospitals, IEEE Computer Society, 2003, pp. 38-46.

* cited by examiner

USER PATH DETERMINING SYSTEM AND METHOD THEREFOR

CROSS REFERENCE TO RELATED APPLICATIONS

This application is a continuation of and claims the benefit of and priority under 35 U.S.C. §§ 119, 120 to U.S. Non-Provisional application Ser. No. 13/763,217, filed Feb. 8, 2013, entitled "User Path Determining System and Method Therefor" by Kevin O'Sullivan, et al., and to U.S. Provisional Patent Application Ser. No. 61/596,980, filed Feb. 9, 2012, entitled "Path Determining System & Method Therefor", by Kevin O'Sullivan, et al., and to Great Britain Patent Application No. 1220976.3, filed Nov. 21, 2012, entitled "User Path Determining System and Method Therefor", by Kevin O'Sullivan, et al., the disclosures of which are incorporated herein by reference as if set forth herein in their entireties.

FIELD OF THE INVENTION

This invention relates to a method and system for determining a user's path. Further, this invention also relates to a method and system for determining the location of a user. More specifically, this invention relates to a method and system for tracking a user within an indoor or outdoor area, such as a hospital, a college campus, a sports arena or an airport This invention also relates to a method and system for determining a user's path for operational and planning purposes, and in particular to a method and system for determining the residence time of a user in a zone.

The invention also has application in providing real time information to passengers, as well as to the scheduling of services so that airport authorities can react to any build up of passengers in critical areas such as security screening, immigration checks, baggage and so on.

BACKGROUND OF THE INVENTION

In the past, airports have had difficulty getting historical and real-time information regarding the behaviour of passengers within and around an airport.

One solution to this problem is to use Bluetooth (Bluetooth is a registered trade mark of Bluetooth SIG, Inc, Washington, United States of America) or Radio Frequency Identification (RFID) tags. However these solutions have the following limitations:
  RFID tags are not typically carried by passengers and therefore cannot be used without specifically issuing them to passengers.
  Bluetooth is a short range protocol limited to small areas of the airport.
  Bluetooth is not commonly active in passenger smart telephone devices, thereby limiting the accuracy of any measurements.
  Bluetooth relies on Bluetooth Access Points in fixed locations. It is relatively complex and time consuming to relocate them if necessary.

Another solution is to use a WiFi triangulation method to track passenger smart telephones. WiFi uses a wireless connection between a user device and an access point to transfer data between the user device and access point. WiFi is a registered trade mark of Wi-Fi Alliance, San Jose, United States of America. Usually, the access point has a wired connection to a local area network (LAN). However, a problem with this approach is that WiFi devices do not emit a continuous stream of data. This is because a device will only be detected when a user is actually using the airport WiFi infrastructure.

This means that for any given device, it may be detected only sporadically throughout the airport. For example, a device may be detected while a passenger is using their telephone in a café, or at a gate area, but not while walking from check in to security zones. This is of course problematic for live dwell time measurements because this sporadic data is not representative of what is actually happening in the airport.

Embodiments of the invention seek to address the above problems by using WiFi signals emitted through passenger smart telephones, and other devices, to provide location data which can be used to locate, track and measure the activities of passengers throughout the airport campus. The location data is processed to remove poor quality data and the remaining data is used to determine a passenger's path and associated dwell time information. This data can then be used to provide real time measurements for any section of the airport.

Embodiments of the invention, which may be referred to as and Indoor Anonymous Dwell Time Tracking system, are a multi component service that:
1. Allows airport staff to define arbitrary zones in the airport.
2. Locates devices using triangulation of WiFi signal strength.
3. Associates these devices to a zone in an airport.
4. Charts the path of devices in these spaces.
5. Maintains a live set of continuous device detections for devices detected in the airport
6. Uses this zone and device path data to determine the dwell time in any zones across the airport.

Embodiments of the invention improve on existing RFID systems because the passengers/consumers being tracked do not need to be given a RFID token to carry, and do not necessarily need to be informed that their movements are being tracked, which can subconsciously change behaviour.

Embodiments of the invention improve on Bluetooth systems because WiFi covers the entire airport campus, not just small specific areas. Therefore it is possible to provide sophisticated measurements such as "show current wait time for passengers in immigration who started in international arrivals". It also improves on Bluetooth systems because the zones being measured are arbitrary and are not tied directly to the location of access points. In this regard, in a Bluetooth system, if an airport wants to modify the zone being measured, it is necessary to physically move the Bluetooth sensors. In the present invention, the airport staff just need to configure the new zone using a Google Map application.

Embodiments of the invention improve on basic WiFi triangulation because it can maintain a live device path, storing all the previous zones a device passed through, and use this data to determine if the data is suitable or not for live dwell time measurements.

SUMMARY OF THE INVENTION

According to a first aspect of the present invention, there is provided a system for determining the path taken by a user through one or more zones. The system may comprise: a location server arranged to receive location data indicative of the location of a communication device associated with the user, the location data defining the position of the communication device at a plurality of different points in time, the location server further arranged to receive sequence data associated with the location data indicative of the order in which the location data was determined; and a path determining means for determining the path of the user through the zone, the user's path being defined by at least a portion of the received location data; and a comparator for comparing the determined path of the user with on or more predetermined user paths. The location server processes the received location data depending upon the result of the comparison. Preferably, the location server corrects the determined user path with the process location data.

According to another aspect of the present invention, there is provided a system for processing user location data comprising: a location server arranged to receive location data of a communication device associated with the user, the location data defining the position of the communication device at a plurality of different points in time, the location server further arranged to receive sequence data associated with the location data indicative of the order in which the location data was determined; path determining means for determining the user's path defined by the received location data and the associated sequence data; and a comparator for comparing the determined path of the user with one or more predetermined user paths. Each predetermined path is preferably defined by further location data and associated sequence data indicative of the order of the further location data. The location server is configured to process the received location data depending upon the result of the comparison. Usually, the location data is determined based on signal strength data which is usually received by an access point from a mobile device.

In yet a further aspect of the present invention, a method for processing user location data is provided. The method comprises receiving, with a receiver, location data of a communication device associated with the user, the location data defining the detected position of the communication device at a number of different points in time, and receiving, with the receiver, sequence data associated with the location data indicative of the order in which the location data was determined; determining, using a processor, the user's path passing through points defined by the received location data and the associated sequence data; and comparing, using the processor, the determined path of the user with one or more predetermined user paths; and processing, using the processor, the received location data depending upon the result of the comparison. Preferably, the determined user path is corrected or updated with the processed location data.

BRIEF DESCRIPTION OF THE DRAWINGS

Embodiments of the invention will now be described, by way of example only, and with reference to the accompanying drawings, in which.

The following description is of a system for use in the aviation industry, but this is exemplary and other applications of the invention will also be discussed. For example, the system may be used in any indoor or outdoor area where a user carries a WiFi enabled device, such as a hospital, a college campus, a sports arena and so on.

Figure 1:
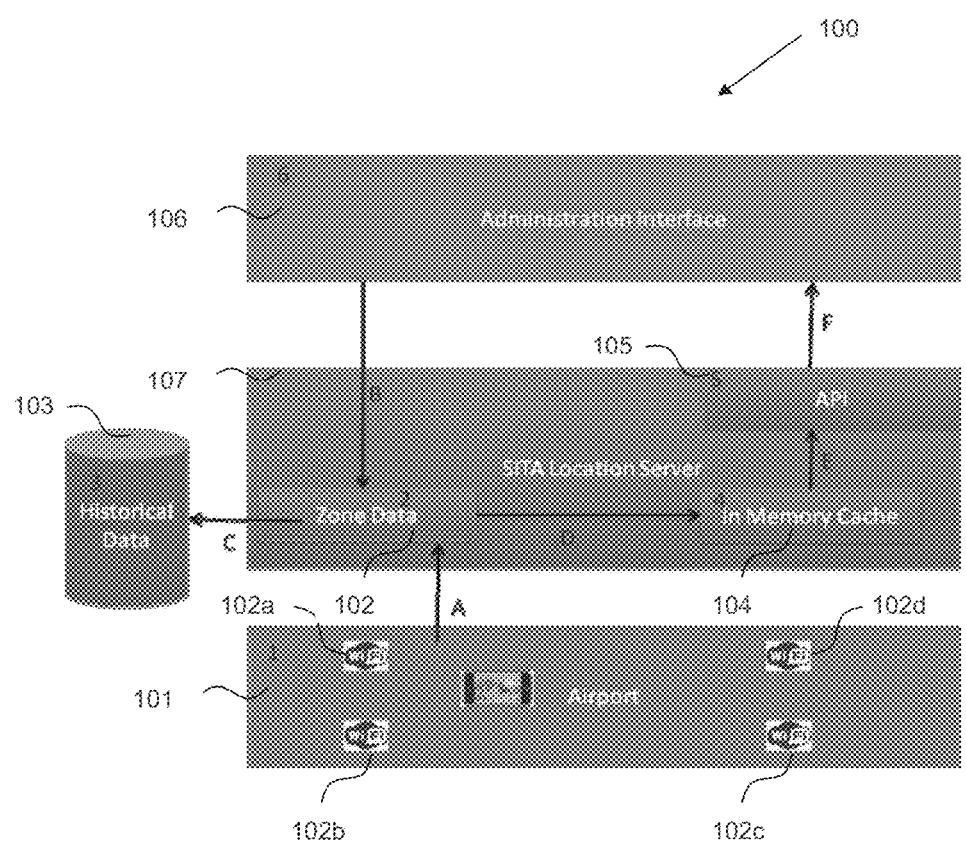
FIG. 1 is a schematic representation of the main functional components embodying the invention.

Referring now to FIG. 1, this shows a schematic representation of a system 100 according to an embodiment of the invention. Operation of the various components will be explained in further detail below.

The system 100 may be directed towards the tracking of users in an airport 101 having a plurality of WiFi access points 101a-101d providing at least part of a WiFi infrastructure in the airport 101. Each access point 101a-101d may be positioned at a different location in the airport 101.

The WiFi infrastructure may use Real-time Locating System (RTLS) triangulation to locate a passenger's smart telephone or other mobile communication device as will be known to the skilled person.

In the embodiment shown in FIG. 1, a location server 107 is communicatively coupled to the airport WiFi infrastructure 101a-101d. The location server 107 may be coupled to the airport infrastructure via a wireless link or a wired link. The sever 107 may run in an airport data centre or as a cloud service over a number of servers, which are usually positioned in different locations.

The server 107 may communicate with the airport network by means of an Application Programming Interface ("API") that is provided by a WiFi vendor or provider. The server 107 may use a particular provider's API to obtain the raw location data from the airport.

The location server 107 may comprise a historical data store 103 for storing the determined movement of devices in the airport. The historical data store may be provided as part of the location server as a hard disk or solid state memory or other local storage means. Alternatively the historical data store 103 may be a separate store located in a different position to the location server 107, such as a hard disk or solid state memory or other remote storage means. The historical data store may store both historical reference data and also data identifying devices belonging to airport staff or infrastructure. In either case, the historical data store 103 is communicatively coupled a zone data component 102 which may be part of the location server 107. This may be using a wired or wireless connection. A zone refers to a spatial area in the airport in which dwell time measurements are to be made. Examples of zones are: Security, Baggage, Immigration, Retail, or Check in.

The zone data component 102 may store a definition of the zones of interest in the airport, for example: airside, landside, security, baggage, retail and so on. The data component 102 may store the zone definitions on a hard disk or solid state memory or in other storage means. The airside part of the airport is usually the part of the airport that is accessible only after a passenger has gone through boarding card and x-ray security checks. The landside part of the airport is usually the part before a passenger has gone through boarding card and x-ray security checks. It is also useful to note that arriving passengers emerges from the baggage hall into the Landside area.

Figure 2:
FIG. 2 is a screen shot of a zone editor embodying the invention which may be used to select, create, edit or delete different zones in the airport to track a user's device.

In the example shown in FIG. 2, and described in further detail below, there are three terminals, T1, T2, and T3. Each terminal comprises a plurality of zones. For example, terminal T1 may comprise the following zones: Airside—First Floor, Airside—Ground Floor, and Landside zones. Terminal T2 may comprise Duty Free, Food, Retail, Airside, Check in, Landside—First Floor, and Landside—Ground Floor zones. Further, Terminal T3 may comprise Baggage and Check in zones, although the above definitions of which zones are associated with which terminal are exemplary only.

The zones are defined as are virtual spaces. A user may define each zone by dragging a polygon out on a map application, such as an internet browser map application running on an administration interface 106. One example of a suitable internet browser map application is a Google maps application. Defining a zone is similar to creating a polygon shape in Microsoft Powerpoint. Google is a registered trade mark of Google Inc., USA, and Microsoft and PowerPoint are registered trade mark of Microsoft Corporation, USA.

It is only necessary to define zones in a region of the airport where access points exist. However, one or more physical access points may be added to or removed from a particular zone without modifying the virtual zones. Furthermore, virtual zones may be redefined without having to modify any airport infrastructure. This addresses one of the problems with Bluetooth identified above in that embodiments of the invention may allow a change in the area being measured or monitored without physically moving access points.

In FIG. 1, the arrow labelled B pointing from the administration interface towards the zone data component schematically shows how the administration interface sends data defining a particular zone to the zone data component. The data defining each zone may be data defining a polygon and preferably associated data defining the position of each access point in the polygon.

The server may also comprise an in-memory cache 104. The cache 104 stores data indicative of the current active devices that are being tracked in the airport, including their current position and zone. The cache may also store an in-memory representation of a path a device has taken as it moves thorough the airport. A path may be defined by the curve line or shape which links or joins a sequence of data points indicative of the position of the device. The sequence of the positional data is usually ordered in a chronological order.

Figure 3:
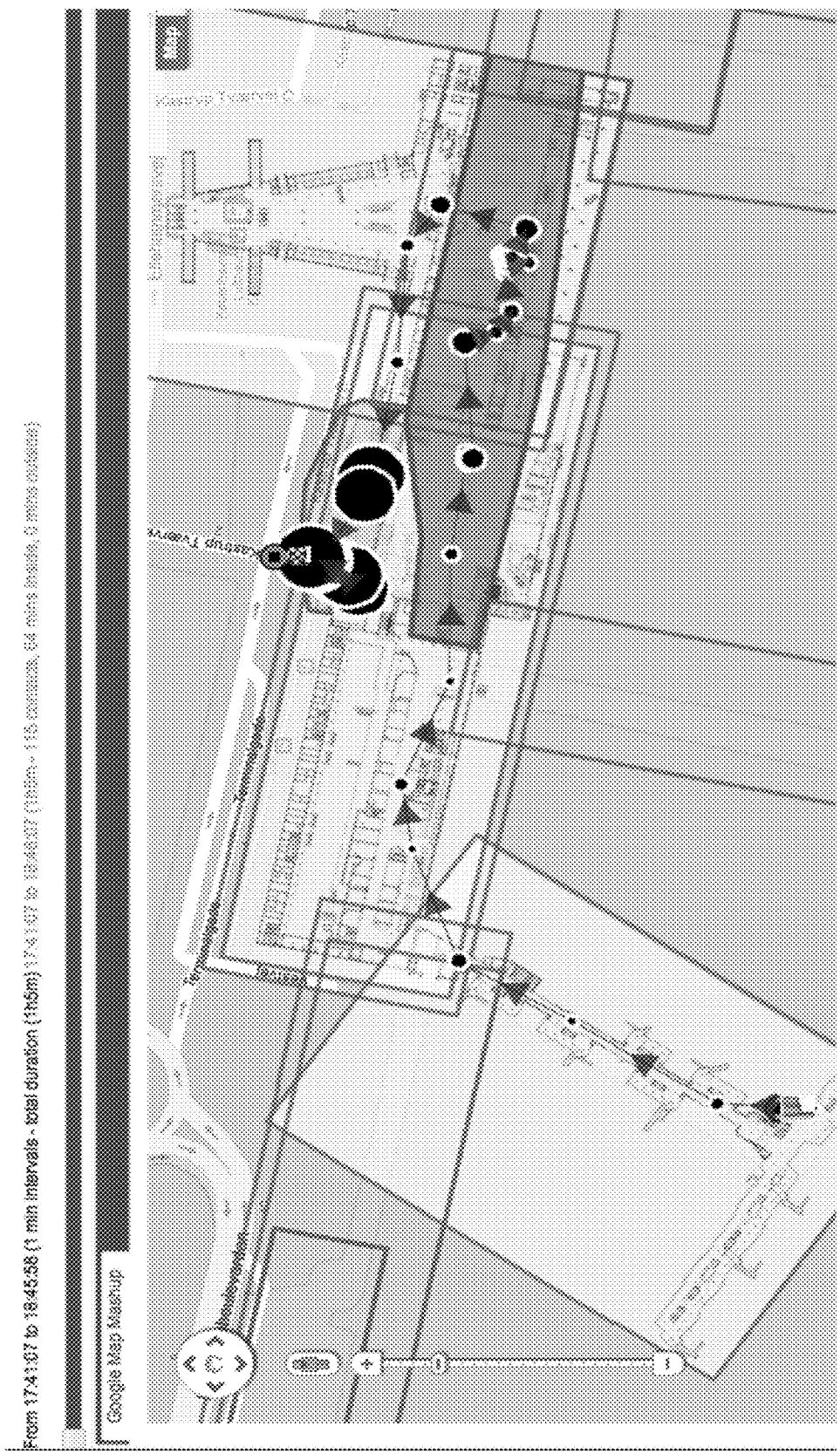
FIG. 3 is a screen shot of an editor embodying the invention in which a high quality device path in the airport is visualised in a particular zone.
Figure 4:
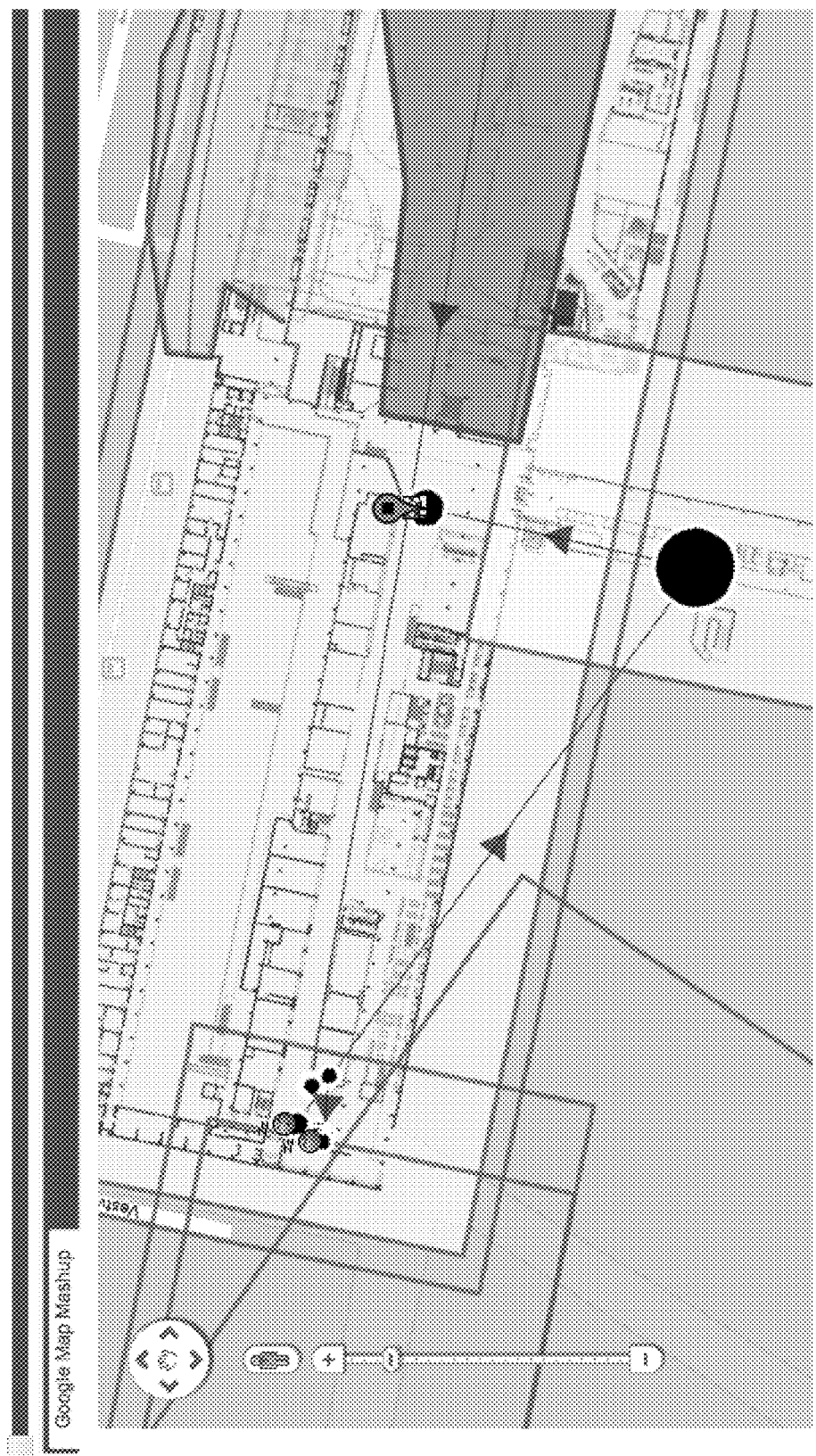
FIG. 4 is a screen shot of an editor embodying the invention in which a lower quality device path in the airport is visualised in a particular zone.

An example of this representation is shown in FIGS. 3 and 4 of the drawings, described in further detail below. FIG. 3 is an example of a device path that is considered a high quality device path. There are plenty of device detections with good accuracy in the desired measurement zone. FIG. 4 is an example of a device path that is considered low quality compared to the device path shown in FIG. 3. There are more infrequent detections than the higher quality device path shown in FIG. 4. The path shown in FIG. 4 is an example of the type of problematic data quality that the invention seeks to address.

The server 107 may also comprise an Application Programming Interface (API) 105. The API provides a way to access the data stored in the in-memory cache 104.

In the embodiment shown in FIG. 1, the API 105 is communicatively coupled to an administration interface 106 and the in-memory cache 104. The administration interface is described in further detail below. Further, the in-memory cache 104 is communicatively coupled to the zone data component 102 and to the API 105. Further, in the embodiment shown in FIG. 1, the zone data component 102 is communicatively coupled to both the historical data store 103 and the airport WiFi infrastructure 101.

The administration interface 106 uses the API 105 to access the memory cache data 104. The administration interface sends a request via the API 105 to access the memory cache data 104. The arrows E and F shown in FIG. 1 represent the memory cache data 104 being sent to the administration interface 106 in response to that request.

As previously described, the system 100 may comprise an administration interface 106 tool. This tool may be used to define the zones and to display the data returned from the API. The administration interface tool 106 is usually provided on a separate or different server to the location server 107 however, they can in principle be provided on a single server. In either case, the administration interface 106 is communicatively coupled to the zone data component 102 and the API 105 within the location server 107.

Figure 6:
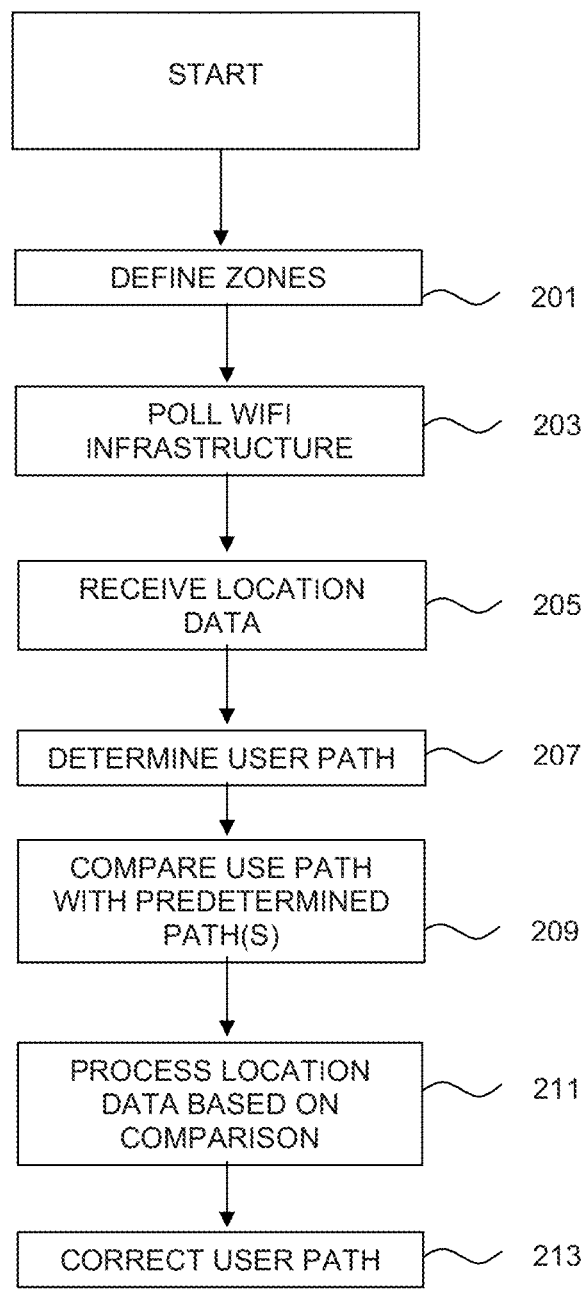
FIG. 6 is a flow diagram showing the main steps performed by an embodiment of the invention.

The various steps performed by an embodiment of the invention will now be described in further detail below, referring to the flow diagram shown in FIG. 6. In some embodiments, not all of the steps shown in FIG. 6 will be performed, and the steps do not necessarily have to be performed in the order shown in FIG. 6.

At step 201, an airport operator uses the Administration Interface 106 to define the zones in the airport. A zone may be defined as a polygon having a plurality of lines joined by a number of vertices. Usually, the polygon is a closed shape so that a user has to cross one of the lines or zone boundary when leaving a zone.

The zone data may be stored in the Zone Data component 102. In addition, the zone data may also be stored offline in the Historical Data Store 103, but it is sufficient for the zone to be stored in a single storage means. An example of a baggage zone is shown in FIG. 2 as a filled black polygon area.

At step 203, the Location Server 107 polls the Airport WiFi infrastructure via a third party server. Usually, the airport WiFi infrastructure is provided by a third party, and therefore the location server 107 polls a third party server which in turn requests data, such as location data associated with all devices which may have moved since the last poll request. Usually, the third party server polls the Airport WiFi infrastructure in a periodic or regular manner. The server may poll the WiFi infrastructure approximately every 15 seconds. However, although the polling may be periodic, the received location data of each device is usually irregular in nature. This is because the airport WiFi infrastructure does not have control as to whether it receives a signal from a device. For example, if a device is temporarily switched off, then no location data of that device will be received by the location server when the device is switched off.

The third party server performs triangulation of the devices as the devices use the WiFi network. The third party server does this by well known triangulation methods familiar to the skilled person. The third party server sends to the location server location data of each mobile device which has been detected by the third party server. This allows the location server 107 to receive data associated with all devices that have moved since the last poll request. The arrow labelled A, shown in FIG. 1 represents this data being sent from the third party location server to the location server 105.

The quality of the data received from the third party server may be determined based on an accuracy value provided by the third party provider. Data quality may be determined based on the signal strength or, the number of access points which can see each device, or both.

In addition, the location data may be time-stamped. This provides additional data indicative of when the location data of a particular device was determined. The system may determine the frequency of detections by comparing the time stamp of sequential location data messages received by the location sever 107.

The third party server then sends raw, or in other words, unprocessed location data to the location server 107. The unprocessed location data may include absolute positional data of each device i.e. longitude and latitude of each device in an airport or in other words, the x and y coordinates of the devices. Usually, the received location data of each device does not depend upon the location of the access point which each device is communicating with. Accordingly, the received location data of each device may be independent of the position of each access point.

At step 205, the location server 105 receives from the third party triangulation server data determining the location of all mobile devices which are active within the airport. This may be performed every 15 seconds, but can be performed more frequently or less frequently than this. After the server has received the location data at step 205, the location server may determine the user's path defined by the received location data and the associated sequence data defining a plurality of points on the path, at step 207. At step 209, the location server compares the determined path of the user with one or more predetermined user paths. At step 211, the location server processes the received location data depending upon the result of the comparison. At step 213, the location server corrects or updates the determined user path based on the comparison.

In some embodiments, the raw data received by the location server 107 may be combined or associated with the Zone Data to give it context. This is done by determining whether or not each device is within the boundary defining a particular zone. If it is determined that a particular device is located in a particular zone, then the location data associated with that device is also associated with the zone in which the device is located.

For example, the location server 107 may compare the location data, i.e., the coordinates of a device with the coordinates defining a zone. If a device is determined to be inside the boundary of a polygon defining the zone under consideration, then the location server 107 associates that zone with the data structure for each device.

The combined or associated data may be referred to as contextual data. The data is combined by the server 107 and then stored in an in-memory (and preferably database) data structure. There is a data structure for each device detected. This data structure contains the coordinates, for example the abscissa (e.g. x coordinate) and ordinate (e.g. y coordinate) of the device.

In other words, each device is associated with a zone at each detected location. Usually, a plurality of devices are associated with each zone. In the example shown in FIG. 3, there are 5522 device paths are found, ready for an operator to review.

For example, there may be many people waiting in security or baggage zones at peak time. If there are 100 people waiting, and the server receives data detecting around 10% of them, then there would be 10 devices active in security or baggage.

Although not essential to all embodiments, the contextual location data may be stored in the Historical Data Store 103.

The contextual location data may also be updated in the In Memory Cache 104, storing a real time representation of the movements of all devices in the airport, as shown in FIG. 3.

The contextual data may be stored in both store 103 and memory cache 104 so that a) any airport staff may be automatically identified during nightly processing because they are in the airport longer than is typical for passengers, and b) so that the airport can use the data for historical comparison.

Each time the data is polled, the live dwell time may be determined for each device within each zones. This is described in further detail with reference to a particular Live Dwell Time Algorithm below.

Figure 5:
FIG. 5 is a histogram showing live dwell time data obtained by embodiments of the invention.

For each communication device, the dwell time may be determined by determining the time when a user was first detected within a zone, and the time when the user was last detected within a zone (before the user moved do a different zone). The dwell time may be computed as the difference in time between the last detection time within a zone and the first detection time within a zone. In the histogram shown in FIG. 5, the number of devices within security is determined as function of wait or dwell time: 5 devices have a dwell time of less than one minute; 6 devices have a dwell time of 1 minute; a further 6 devices have a dwell time of 2 minutes; a further 6 devices have a dwell time of 3 minutes; 2 devices have a dwell time of 4 minutes; 2 further devices have a dwell time of 5 minutes; while finally, 2 devices have been determined to have a dwell time of 6 minutes in security. Steps 203, 205, 207, 209, 211, and 213 may be repeated as updated location data is received by the location server 107.

The dwell time is the amount of time that passengers spend in a particular area (i.e., a Zone) of the airport. This term is interchangeable with Wait Time. Dwell Time is used in areas of an airport that a passenger wants to be in for example retail, food hall. Wait Time is used in areas of an airport that a passenger doesn't want to be in, for example check in, security, baggage collection.

The data may be made accessible to 3rd parties via the API. In other words, $3^{rd}$ parties may access the data stored in the historical data store 103 (and the in memory cache 104). This live data is in stored in memory 104, while the historic data is stored in historical data store 103. The data (both real time or historical or both) may be viewed using the Administration Interface 106, as shown in FIG. 4, although this step is in fact optional.

The processing, using an algorithm, of the raw WiFi positional data of each mobile device within the airport will now be described in further detail. The algorithm uses the received positional data to determine live dwell time of each mobile device within the airport. This algorithm may be performed every time the location server 107 refreshes the location of devices in the Airport.

When measuring the live dwell time for a given zone such as security, it is necessary to factor in the following data quality problems:
1. Staff and static WiFi devices (e.g., staff personal computers (PCs)) in the security should be filtered out.
2. The sporadic and periodically inaccurate nature of WiFi data means that devices that are passing near to, but not through, the Security zone may be incorrectly reported as being in Security.
3. The number, accuracy and frequency of detections will vary for devices.

Embodiments of the invention address these data quality problems in a number of different ways.

Handling Staff Devices

The Location Server 107 maintains a dynamic list of staff and infrastructure at the airport (Historic Data 103 above). This list is automatically generated by monitoring for devices that are in the airport for a long time which may be typical of a staff member working there, or are frequently in the airport which may be typical of airport staff working 5 days a week.

Devices in the Security zone are then compared with this list and filtered out from the results.

Handling Inaccurate or Partial Paths

Inaccurate WiFi data can be smoothed out or eliminated by using the typical path of a departing passenger through the airport. The following example refers to a departing passenger because it is described in conjunction with a security area, and only departing passengers pass through security. Nevertheless, the processing steps equally apply to other passenger types such as arriving passengers.

The device path can be used to profile the passenger as a Departing, Arriving or Transfer passenger. In addition the device path can be profiled as Airport Staff, or a welcoming agent also known as a Meeter/Greeter.

The typical path of a departing passenger is given by the following sequence of zones:

LANDSIDE CHECK IN SECURITY AIRSIDE RETAIL GATE AREA

That is, a passenger arrives at the airport in the LANDSIDE zone, then CHECKS IN, then passes through SECURITY to the AIRSIDE zone. The passenger will typically dwell in the RETAIL area until ready for boarding and then go to the GATE AREA.

For the purposes of measuring dwell time in security, any paths that contain LANDSIDE or CHECKIN in the past, and do not contain AIRSIDE/RETAIL/GATEAREA can be considered good representative paths.

Examples of inaccurate paths caused by the sporadic nature of the WiFi data are:

1. SECURITY [SLEEP] GATE AREA

This would be an example of a path where a device is first detected in the SECURITY area, then enters SLEEP mode where it is no longer detected by the WiFi infrastructure, and after a long period of time detected in GATEAREA. This is a bad path because a) It is not known how long the device was in SECURITY before it was first detected and b) because it entered a SLEEP mode and was undetected, it is not known how long it remained there before going AIRSIDE.

1. AIRSIDE GATE AREA BAGGAGE SECURITY LANDSIDE

This is an example of an arriving passenger who has arrived at AIRSIDE in the GATEAREA, and walked to BAGGAGE to collect their bags. Before going LANDSIDE, the passenger is briefly (and incorrectly) detected in the SECURITY zone because of poor WiFi quality. This device path will therefore have to be eliminated from the dwell time measurements.

Because the full device path is maintained in memory, it is possible to filter or remove these bad quality paths by specifying filter criteria in the algorithm. The filter criteria vary according to the zone being measured, and therefore must be configurable for the zone in question. The following is an example of the filter criteria for two zones:

1. Security Zone
a. Device must be in Security Zone, or device must have just transitioned out of Security into AIRSIDE
b. Device must never have been AIRSIDE
c. Device must have previously been LANDSIDE
d. Device path must match profile for Departing Passenger
2. Baggage Zone
a. Device must be in Baggage Zone, or device must have just transitioned out of Baggage into LANDSIDE
b. Device must never have been LANDSIDE
c. Device must have previously been AIRSIDE
d. Device path must match profile for Arriving Passenger Handling Number, Accuracy & Frequency of Detections The live dwell time algorithm may factor in the number, accuracy & frequency of detections to determine the quality of any given device path for use. These three factors are important because:

1. In general, the more detections that of a particular device path, the better quality of that device path. Closely related to this is the accuracy and frequency of these detections.

2. The accuracy can vary from detection to detection, caused by environmental factors at the airport. The higher the accuracy, the more reliable the data.

3. The frequency of detections varies along the device path (typically due to whether the passenger is using the device or not). Infrequent detections is a problem because if a device has not been detected for, say 2 minutes, it is not possible to tell if the device is still in Security or has moved out of Security. FIGS. 2 and 3 show examples of device paths with high and low frequency.

The algorithm factors in these three parameters when assigning a quality value to the path. Of particular importance are the frequency and accuracy of detections as the device transitions from CHECKIN to SECURITY and from SECURITY to AIRSIDE. If a determination can be made with a high degree of accuracy when a device moves into/out of SECURITY, then embodiments of the invention can determine with a high degree of accuracy how long the device spent in SECURITY.

The device path has to meet a quality threshold to be usable for zone dwell time measurement.

Accordingly, embodiments of the invention combine an arbitrary zone definition, device path profiling, device path filtering by history and device detection quality profiling such that that the variable and sporadic nature of WiFi signals can be processed. This allows live (as well as historic) dwell times of a user in any part of an airport to be determined.

The invention claimed is:

1. A system for profiling a user comprising:
   a. a server arranged to receive location data of a communication device associated with the user, the location data defining the detected position of the communication device at a number of different points in time, the server further arranged to receive sequence data associated with the location data indicative of the order in which the location data was determined, the server further arranged to compare the location data with zone data defining a plurality of zones and to associate the location data with one of the plurality of zones;
   b. a path determinator for determining the user's path through a first sequence of zones, wherein the path determinator is configured to determine the user's path based on the zone data associated with the location data and the sequence data; and
   c. a memory for storing a plurality of predetermined user types;
wherein the server is further arranged to profile the user as one or more predetermined user types based on the determined path;
wherein the system further comprises a comparator for comparing the determined path with one or more predetermined paths, each predetermined path defining a second sequence of zones associated with a respective stored predetermined user type, and for further profiling the user based on the comparison; and
wherein the server is further arranged to associate the user with one or more predetermined user types comprising a departing passenger, an arriving passenger, a transfer passenger, an airport staff or a welcoming agent type based on the determined first sequence of zones.

2. A system according to claim 1 wherein the zones are associated with an indoor or outdoor location, in particular one or more of a hospital, a campus, an arena and an airport, and wherein each zone is associated with one or more of a landside, airside, check-in, security, retail, baggage, immigration, duty free, food, retail and gate area zones.

3. A system according to claim 1 further comprising an administration interface for defining each of the zones.

4. A system according to claim 1 wherein the zone data is associated with a plurality of different terminals of an airport and wherein the zone data associated with each terminal comprises a plurality of different zones on different levels.

5. A system according to claim 1 wherein each zone is defined based on a polygonal shape and wherein the data defining each zone comprises associated data defining the position of an access point within the polygon.

6. A system according to claim 1 further comprising storing data defining the plurality of zones in a zone data component.

7. A system according to claim 1 in which the server is configured to poll a further server to request location data associated with devices which have moved since a previous poll request, wherein the poll requests are periodic and associated with location data received at irregular times.

8. A system according to claim 1 in which the location data further comprises time stamp data and wherein the user is associated with one or more predetermined user types based on the time stamp data.

9. A system according to claim 8 wherein the system is arranged to determine a period of time a user is within one or more zones and wherein the system is to associate the user with one or more predetermined user types if the period of time is greater than a predetermined value and wherein the one or more predetermined user types comprise an airport staff user type.

10. A system according to claim 8 wherein the server is further arranged to determine a dwell time associated with the one or more zones based on a difference in time stamp data between a first detection of a user within a zone and a last detection of a user within the zone.

11. A system according to claim 10 wherein the server is arranged to associate the user with one or more predetermined user types based on the dwell time.

12. A method for profiling a user comprising:
 a. receiving location data of a communication device associated with the user, the location data defining the detected position of the communication device at a number of different points in time;
 b. receiving sequence data associated with the location data indicative of the order in which the location data was determined;
 c. comparing the location data with zone data defining a plurality of zones;
 d. associating the location data with one of the plurality of zones;
 e. determining the user's path through a first sequence of zones;
 f. storing a plurality of predetermined user types, wherein the predetermined user types comprise a departing passenger, an arriving passenger, a transfer passenger, an airport staff or a welcoming agent type; and
 g. profiling the user as one or more of the predetermined user types based on the determined path and based on the determined first sequence of zones; wherein the method further comprises comparing the determined path with one or more predetermined paths, each predetermined path defining a second sequence of zones associated with a respective stored predetermined user type, and for further profiling the user based on the comparison.

13. A method according to claim 12 further comprising polling a further server to request location data associated with devices which have moved since a previous poll request, wherein the poll requests are periodic and associated with location data received at irregular times.

14. A method according to claim 12 wherein the location data further comprises time stamp data, wherein the user is associated with one or more predetermined user types based on the time stamp data and the method further comprises determining a period of time a user is within one or more zones and wherein the method associates the user with one or more predetermined user types if the period of time is greater than a predetermined value and wherein the one or more predetermined user types comprise an airport staff user type.

15. A method according to claim 12 wherein the location data further comprises time stamp data, wherein the user is associated with one or more predetermined user types based on the time stamp data and the method further comprises determining a dwell time associated with the one or more zones based on a difference in time stamp data between a first detection of a user within a zone and a last detection of a user within the zone.

16. A method according to claim 15 further comprising associating the user with one or more predetermined user types based on the dwell time.

* * * * *